United States Patent
Bulan et al.

(10) Patent No.: US 9,965,677 B2
(45) Date of Patent: May 8, 2018

(54) METHOD AND SYSTEM FOR OCR-FREE VEHICLE IDENTIFICATION NUMBER LOCALIZATION

(71) Applicant: Xerox Corporation, Norwalk, CT (US)

(72) Inventors: Orhan Bulan, Henrietta, NY (US); Howard Mizes, Pittsford, NY (US); Vladimir Kozitsky, Rochester, NY (US); Aaron M. Burry, Ontario, NY (US)

(73) Assignee: Conduent Business Services, LLC, Dallas, TX (US)

( * ) Notice: Subject to any disclaimer, the term of this patent is extended or adjusted under 35 U.S.C. 154(b) by 338 days.

(21) Appl. No.: 14/564,347

(22) Filed: Dec. 9, 2014

(65) Prior Publication Data

US 2016/0162761 A1 Jun. 9, 2016

(51) Int. Cl.
*G06K 9/00* (2006.01)
*G06K 9/32* (2006.01)

(52) U.S. Cl.
CPC ..... *G06K 9/00456* (2013.01); *G06K 9/00771* (2013.01); *G06K 9/325* (2013.01); *G06K 2209/01* (2013.01); *G06K 2209/15* (2013.01)

(58) Field of Classification Search
None
See application file for complete search history.

(56) References Cited

U.S. PATENT DOCUMENTS

| 7,302,098 | B2 | 11/2007 | Tang et al. |
| 8,265,988 | B2 | 9/2012 | Hedley et al. |
| 8,504,415 | B2 | 8/2013 | Hedley |
| 8,738,525 | B2 | 5/2014 | Balachandran |
| 2011/0194733 | A1 | 8/2011 | Wilson |
| 2013/0101171 | A1 | 4/2013 | Bulan et al. |
| 2013/0132166 | A1 | 5/2013 | Wu et al. |

(Continued)

FOREIGN PATENT DOCUMENTS

| EP | 2 518 695 A1 | 10/2012 | |
| JP | WO 2014188753 A1 * | 11/2014 | ........... G06K 9/3283 |

OTHER PUBLICATIONS

Opitz, Michael. Text Detection and Recognition in Natural Scene Images. na, 2013.*

(Continued)

*Primary Examiner* — Vu Le
*Assistant Examiner* — Tracy Mangialaschi
(74) *Attorney, Agent, or Firm* — Kermit D. Lopez; Luis M. Ortiz; Ortiz & Lopez, PLLC

(57) ABSTRACT

Methods and systems for localizing numbers and characters in captured images. A side image of a vehicle captured by one or more cameras can be preprocessed to determine a region of interest. A confidence value of series of windows within regions of interest of different sizes and aspect ratios containing a structure of interest can be calculated. Highest confidence candidate regions can then be identified with respect to the regions of interest and at least one region adjacent to the highest confidence candidate regions. An OCR operation can then be performed in the adjacent region. An identifier can then be returned from the adjacent region in order to localize numbers and characters in the side image of the vehicle.

20 Claims, 11 Drawing Sheets

(56) References Cited

U.S. PATENT DOCUMENTS

2013/0278767 A1 10/2013 Bernal et al.
2016/0092745 A1* 3/2016 Wada .................. G06K 9/3283
382/177

OTHER PUBLICATIONS

Thome, Nicolas, et al. "A cognitive and video-based approach for multinational license plate recognition." Machine Vision and Applications 22.2 (2011): 389-407.*

Huang W, Qiao Y, Tang X. Robust scene text detection with convolution neural network induced mser trees. In European Conference on Computer Vision Sep. 6, 2014 (pp. 497-511). Springer International Publishing.*

Adaptive Recognition America—Carmen of US DOT (USDOT) Number Recognition Software Library & SDK, Printed Oct. 13, 2014, 2 pages, http://www_adaptiverecognition_com/20130531/p0401_html.

Morrone, F., "USDOT Regulations," NLA Legal Counsel, (2009) 2 pages.

Point Grey, USDOT Recognition System Helps Keep America's Roads Safe, printed Oct. 13, 2014, 3 pages, http://ptgrey.com/news/pressreleases/details.asp?articleID=556.

Zhu, Xi et al., "Face Detection, Pose Estimation, and Landmark Localization in the Wild," Computer Vision and Pattern Recognition (2012), Providence, Rhode Island, June, 8 pages.

* cited by examiner

METHOD AND SYSTEM FOR OCR-FREE VEHICLE IDENTIFICATION NUMBER LOCALIZATION

TECHNICAL FIELD

Embodiments are generally related to automated vision-based recognition applications. Embodiments are additionally related to transportation services and applications. Embodiments are also related to techniques for improving localization accuracy in the automated camera-based recognition of vehicle identification numbers

BACKGROUND OF THE INVENTION

The Federal Motor Carrier Safety Administration (FMCSA) requires that an active and valid U.S. Department of Transportation (USDOT) identification number must be properly displayed on commercial motor vehicles. The USDOT's regulations mandate that companies that operate commercial vehicles transporting passengers or hauling cargo in interstate commerce must be registered with the FMCSA and must have a USDOT number. The information to be displayed on both sides of the vehicle consists of (a) the legal name or a single trade name of the motor carrier operator and (b) the operator's motor carrier identification number preceded by the letters "USDOT". A violation of the vehicle identification requirements can result in a fine of as much as, for example, $11,000.

A number of transportation management companies are interested in automated camera-based recognition of USDOT numbers, wherein a camera is installed on the side of the road and triggered by an in-road sensor to capture an NIR/RGB image of an incoming truck. The captured image is then processed to first localize and then recognize the USDOT number on the side of the vehicle.

Currently, techniques are in operation, which automatically recognize USDOT numbers from vehicle side images captured by an NIR camera. FIG. 1, for example, illustrates a sample prior art image 10 of a side vehicle captured by a camera. The image 10 shown in FIG. 1 is a sample of the image of the side of a truck. The particular image 10 depicted in FIG. 1 not only contains the US DOT number at the bottom of the truck door, but the vehicle identification number in the center and the name of the trucking company above that. Other trucks may contain additional information such as the weight of the truck and the location of the trucking company. A full image of the truck may also contain text in the form of marketing signage and information that identifies the function of the truck. An algorithm to identify the tag number must be robust against the presence of all this additional information.

The USDOT number is written on the side of the truck either to the right of or below the "USDOT" tag. The USDOT tag and number can be written with a variety fonts and sizes on the side of the truck. The localization and recognition systems have to account for this variation in the operational phase. One approach to localize the USDOT number is to first locate the text "USDOT" preceding the USDOT number using an OCR engine. The standard approach is robust for high quality images characteristic of news and movies. However, image captures of the side of the truck are not always performed under optimal conditions. Imaging at night often requires a NIR camera. The images may be noisy and of low contrast.

A common practice to locate USDOT numbers in captured images is by using Optical Character Recognition (OCR) engines. Some images are captured under a variety of illumination conditions and can be noisy and have low contrast. OCR-based localization for these images yields low detection performance. The images are highly structured and can contain a great deal of text besides the USDOT tag number. OCR-free localization as will be described in this invention treats the text "USDOT" as a single item that is to be identified in the image.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved image-processing and image-recognition system and method.

It is another aspect of the disclosed embodiments to provide for a system and method for localizing numbers and characters in images captured by cameras.

It is yet another aspect of the disclosed embodiments to provide for object detection using sliding windows to locate particular text in images.

The aforementioned aspects and other objectives and advantages can now be achieved as described herein. Systems and methods are disclosed for localizing USDOT numbers in images captured by cameras installed at toll booths, highways, on the side of the road, etc. Existing methods identify regions that are likely to be text and then perform OCR to locate USDOT numbers. The disclosed approach breaks the problem into two steps. First, object detection can be performed using a series of sliding windows to locate the text "US DOT" in the image of the side of the vehicle. The classifier is trained offline from a training set that contains a variety of fonts and sizes of "US DOT" tags. A negative sample set that spans this variation can be included in the training set.

The negative samples can be generated using randomly cropped patches that contain the same amount of structure (edges, line thickness) as the positive samples, but which do not contain the full "USDOT" identifier. In the operational phase, given a vehicle side image, a series of sliding window searches can be performed using the classifier trained in the offline phase to locate potential USDOT tags in the image. A set of candidate windows can then be identified using a non-maximum suppression technique. The locations with the largest scores are candidates for the USDOT tag and are examined in descending order. The window that best matched the size and aspect ratio of the US DOT text is used to estimate the size and aspect ratio of the USDOT tag number for OCR.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed systems and methods allow for localization of USDOT numbers in vehicle side-view NIR/RGB images. This approach generally involves two phases: an offline phase and an online phase. The offline phase includes the creation of a dataset that contains positive images of where the text "USDOT" is present and negative images where the text "USDOT" is absent. From this dataset a classifier can then be trained, which assigns a probability that the text "USDOT" is located at any particular sub-region in an image. The online phase can be used during the operation of the USDOT tag identification to localize wherein the image of a truck, for example, the USDOT tag is located.

Figure 1:
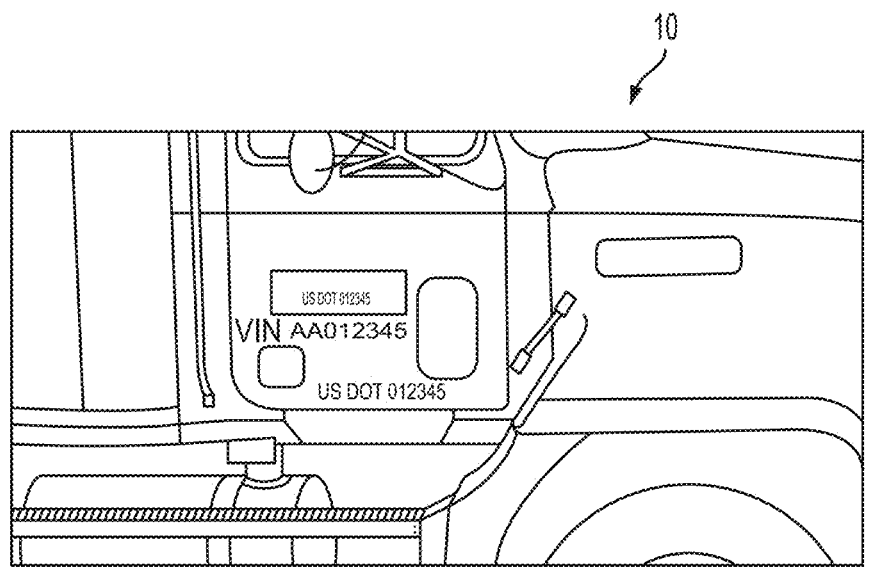
FIG. 1 illustrates an example prior art image of a side vehicle captured by at least one camera.
Figure 2:
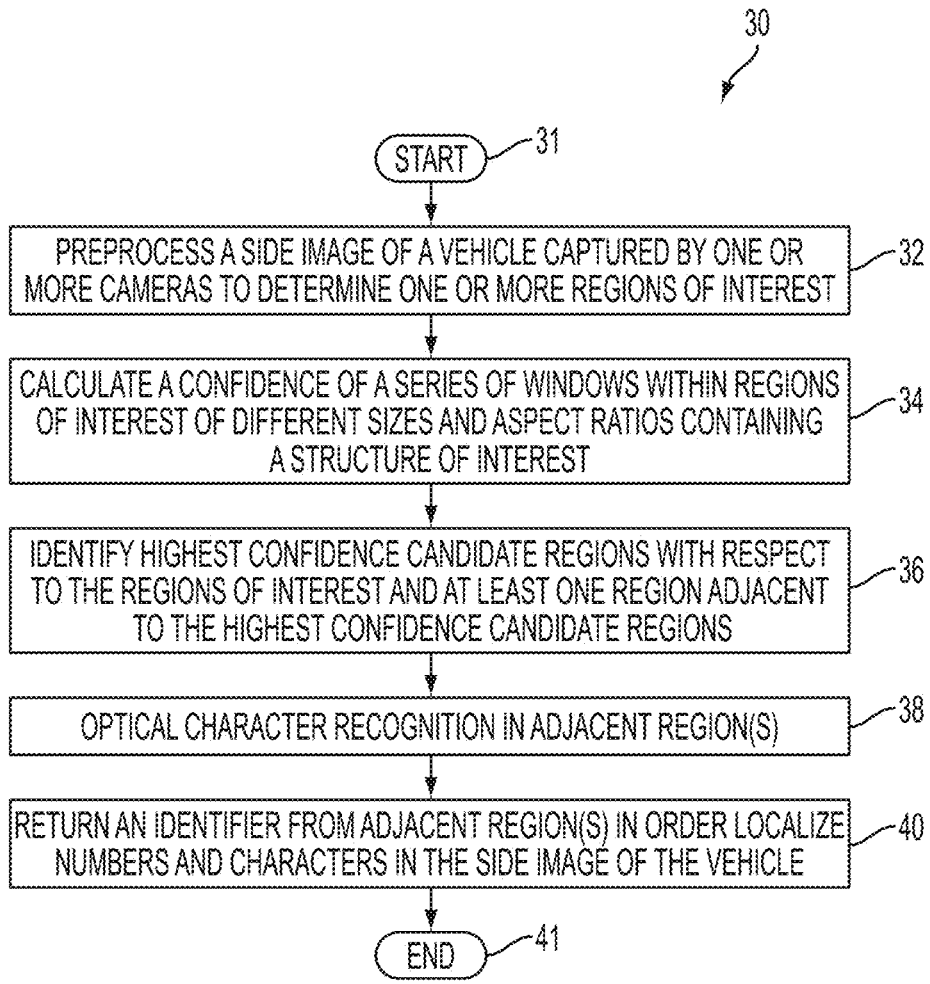
FIG. 2 illustrates a flow chart of operations depicting logical operational steps of a method for localizing numbers and characters in captured images, in accordance with a preferred embodiment.

FIG. 2 illustrates a flow chart of operations depicting logical operational steps of a method 30 for localizing numbers and characters in captured images, in accordance with a preferred embodiment. The process begins as indicated at block 31. Then, as indicated at block 32, a side image of a vehicle can be captured by one or more cameras to determine one or more regions of interest. Thereafter, a step or logical operation can be implemented, as depicted at block 34 to calculate a confidence of a series of windows within regions of interest of different sizes and aspect ratios containing a structure of interest. Next, as described at block 36, a step or logical operation can be implemented for identifying highest confidence candidate regions with respect to the regions of interest and the region adjacent to the highest confidence candidate regions. Then, as shown at block 38, an optical character recognition operation can be performed in or with respect to the adjacent region(s). Thereafter, as illustrated at block 40, a step or logical operation can be provided to return an identifier from the adjacent region(s) in order localize numbers and characters in the side image of the vehicle.

Note that following the extraction of the positive sample from the image, negative samples can be taken from the same image. However, a good negative set of samples should not be taken from anywhere in the image. As will be discussed later, the image is processed to find likely areas where one would see, for example, a USDOT tag. The same processing should be performed so that negative samples for training are extracted only from these areas.

As mentioned earlier, raw images can have low contrast and may be noisy. Therefore, preprocessing the image may be necessary (e.g., see block 32). The preprocessing steps or operations can be implemented via standard low-level algorithms in computer vision. These algorithms may involve median filtering, which removes the salt and pepper noise typical of low contrast images. The preprocessing step may also include adaptive histogram equalization. Under some conditions, particularly those taken at night with an NIR camera may produce an image, which is not uniformly illuminated.

Identification of text requires good contrast between the letters and the background, wherever it may occur in the image. Adaptive histogram equalization will create this contrast under these suboptimal conditions. Another preprocessing step may involve image binarization, where pixels greater than a given threshold become foreground and the other pixels become the background region. Following this operation, a series of morphological opening and closing operations can be performed. The structuring elements can be selected such that noise and large uniform regions are eliminated from the foreground, and structure typical of text is combined to become blobs. The union of these blobs can become a mask that identifies potential text regions.

Note that one or more regions in the masked area can be identified with dimensions the size of the manually clipped "US DOT" image and which do not overlap with it. Regions from the original image can be clipped at this area as shown at block 38 and these images then added to the negative dataset. The negative samples may contain text that is not the text "USDOT". The negative samples may also contain structure in the truck such as the door handle or the side mirror, which contains similar edges, and other structure present in text.

After the dataset is created, a classifier can be trained using standard machine learning algorithms as indicated at block 40. In this operation, first a set of features can be extracted from both the positive and negative samples in the offline phase. The extracted features can then be employed to train a classifier to distinguish DOT/USDOT tag images from other type of image patches. The extracted features may include one or more of, for example, Fisher Vector, Histogram of Oriented Gradients (HOG), Harris corners, Local Binary Patterns (LBP), among others. The process can then terminate, as shown at block 41.

Note that in one experimental embodiment, HOG was used to extract the features. The manually clipped image has a variety of sizes and aspect ratios. The image was re-sampled to a 21×7 image before passing it to the HOG classifier, although different re-sampling ratios may be used. Note that in some embodiments, the classifier trained using the extracted features can be, for example, one of the following: support vector machines (SVM), k-nearest neighbor (KNN), neural networks (NN), or convolutional neural networks (CNN), etc. It can be appreciated these are mere examples of possible classifiers that can be adapted for use with the disclosed embodiments, and that other types of classifiers may also be employed in the context of the disclosed embodiments. That is, the disclosed embodiments are not limited to such example classifier types.

Figure 3:
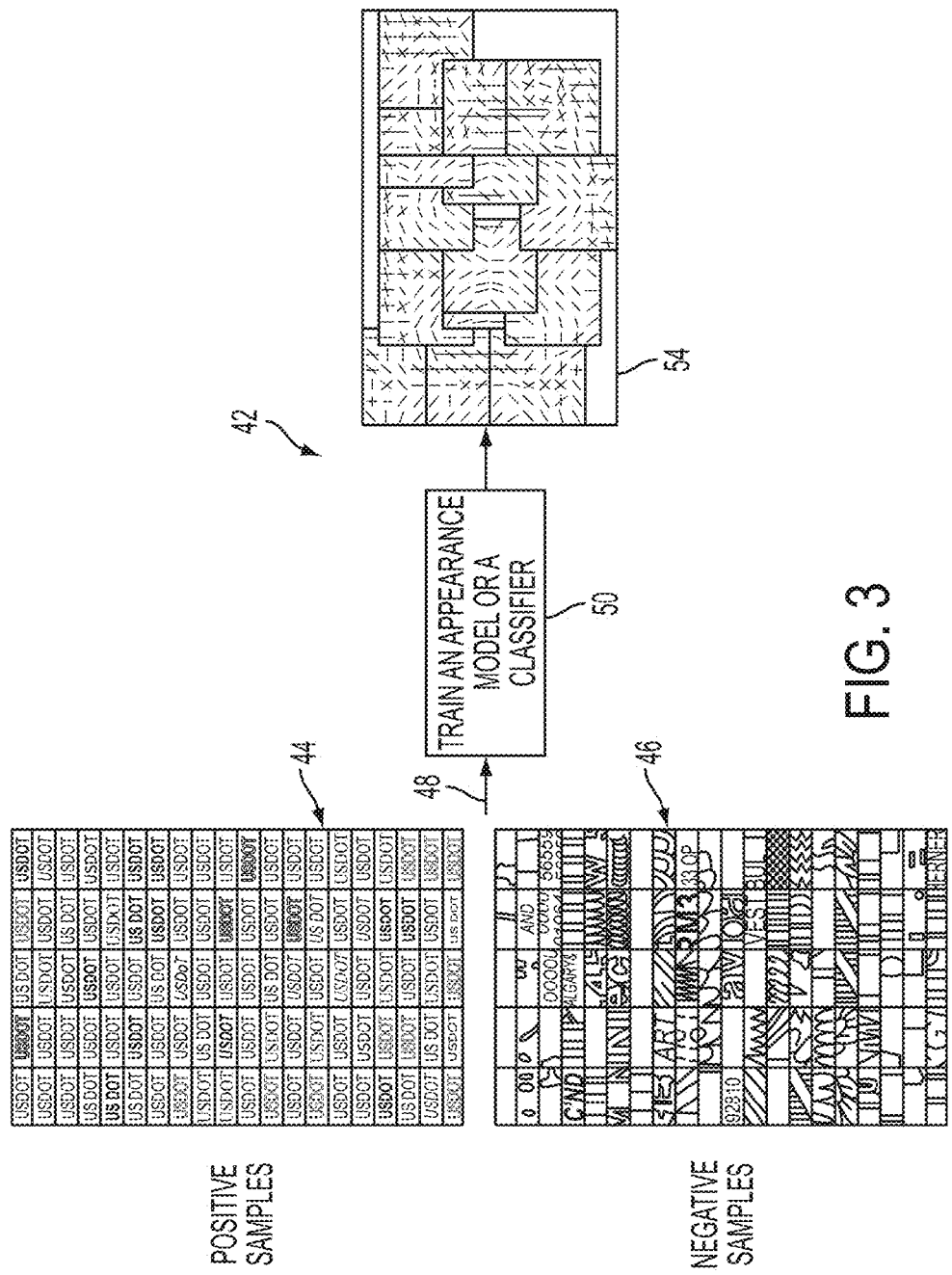
FIG. 3 illustrates a block diagram depicting an overview of an offline training phase, in accordance with an alternative embodiment.

FIG. 3 illustrates a block diagram depicting a particular example of an alternative offline training phase 42, in accordance with a preferred embodiment. The offline training phase 42 shown in FIG. 3 is an example of a classifier training operation. In the example shown in FIG. 3, the detected features are HOG features. Positive samples 44 and negative samples 46 can be provided as input 48 (e.g., an input image) to a training module 50, which can be employed to train an appearance model or a classifier. The training module 50 generates an output 54 constituting a set of features dependent on the input image. In the example shown in FIG. 3, output 54 can be a trained model with located marks similar to that shown in FIG. 4(b).

Figure 4A:
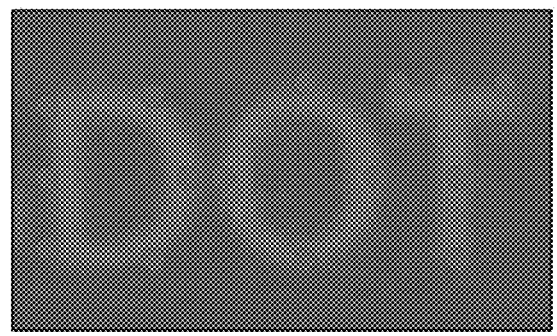
FIG. 4(a) illustrates an image of landmarks located on a sample USDOT tag, in accordance with a preferred embodiment.
Figure 4B:
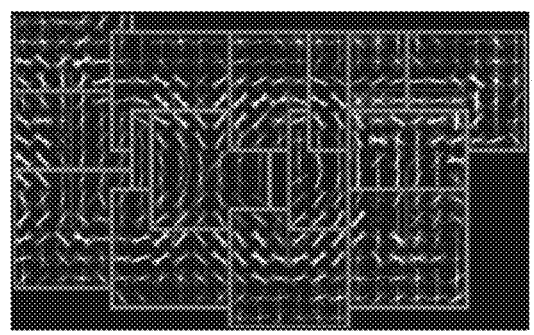
FIG. 4(b) illustrates a trained model using located marks, in accordance with a preferred embodiment.

FIG. 4(a) illustrates an image 72 of landmarks located on a sample USDOT tag, in accordance with a preferred embodiment. FIG. 4(b) illustrates a trained model 74 using located marks, in accordance with a preferred embodiment. With this approach, an appearance-based model can be trained to detect and locate a "USDOT" tag in a given vehicle side-view image. We note that USDOT number is sometimes preceded by "DOT" instead of "USDOT" tag. In order to capture this variation, the model can be trained for "DOT", which is included in both models. For this purpose, in one sample implementation, 15 landmarks are located in positive samples to model the appearance of DOT/USDOT tag. The dots depicted image 72 in FIG. 4(a) show the located landmarks used in a sample model.

The number of landmark points can be adjusted based on the amount of unique features to be included. For example, for detecting faces in different poses in an image, more than 30 landmark points are needed in order to include unique facial features such as nose and eyes. In DOT/USDOT tag localization, the edges are mostly straight lines or curves. Hence, there is less benefit to include many landmark points. Too many points can significantly increase the amount of manual work in the training phase and computational cost in the on-line application. Because the relationships between landmark points are processed through dynamic programming, the end points of the sequence of points cannot be connected. The choice of where to position the end points can potentially affect the performance and thus must be done with care. Also note that in our specific implementation, we used only one mixture to develop the model, but more than one mixture can also be used to capture different appearances of the "USDOT" tag.

Once we determine the set of landmark points and their relative locations within the window, the 15 landmark points can be labeled manually in a set of training images similar to FIG. 4(a) in the same sequence. Negative samples are areas other than the located landmarks in the scene. The training process then constructs a model by learning the appearance at each of the landmark points and the relationship between points as shown in FIG. 4(b).

In some embodiments, a system can employ both of the classical machine learning and appearance-based model to detect a DOT/USDOT tag from side-view images. The classification scores from each method can be fused to calculate the final confidence score for the detected tag.

Figure 5:
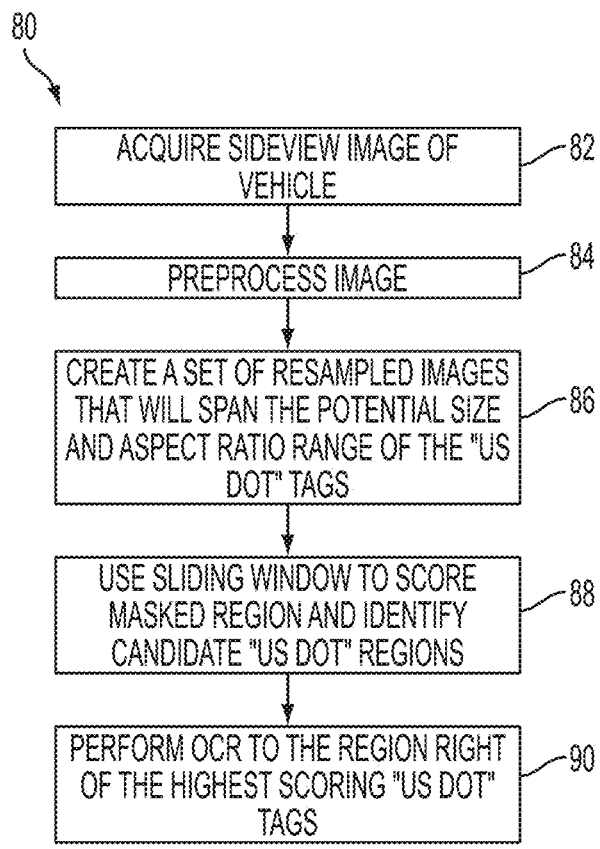
FIG. 5 illustrates a high level flow chart of operations depicting logical operational steps of a method for locating and reading DOT numbers, in accordance with an alternative embodiment.

FIG. 5 illustrates a high level flow chart of operations depicting logical operational steps of a method 80 for implementing the online phase of locating and reading DOT numbers, in accordance with an alternative embodiment. FIG. 5 depicts a method or process, which can be utilized to identify, for example, a USDOT tag on a truck from a captured image.

The process begins as indicated at block 82, wherein a vehicle side-view image with a USDOT number thereon is acquired. Such an image (or images) can be captured at highways, local roads, traffic lights, etc., by using commercially available cameras, which are installed on the side of the road and directed perpendicular to traffic direction. In some situations, NIR cameras coupled with an external illuminator may be required because night vision is desired, distraction of motorists is minimized (illumination not visible), and imaging is more robust to fog, rain, and snow compared to visible light systems. An NIR camera can also be coupled with an external in-road sensor that triggers the camera when an incoming truck is detected.

Once the camera is triggered, one or more images may be needed to capture a vehicle side-view containing the USDOT number. The process continues, as shown at block 84, with preprocessing of the image to identify masked areas that potentially contain text. The purpose of the preprocessing of block 84 in FIG. 5 is to limit the region of the image that needs to be examined to identify the USDOT tag in order to reduce the processing time required because most applications require near real-time performance.

In one embodiment in the formation of the training dataset, all the "US DOT" tags were rescaled to the same size 21×7. However, in any particular image during the online phase, the size of the "US DOT" tag is unknown. Therefore, a series of re-sampled images can be created as indicated at block 86. In the re-sampled image, the magnification in the horizontal direction is not necessarily the same as the magnification in the vertical direction. At least one of the images in the set of images produced by re-sampling at different magnifications should contain a USDOT text that in a window approximately matches the size of the USDOT text in the training set produced by process 30.

The number of magnifications within this range to produce an approximate match is chosen so that the magnification will vary approximately a factor of 1.3 between two magnifications in either the horizontal direction or the vertical direction. For example, if the HOG model was trained on text with a width of 21 pixels, and the width of the text is expected to vary between 63 and 126 pixels in the online phase, then re-sampling by approximately a factor of 3, 3.8, 4.8, and 6 in the horizontal direction should be performed. The step size of 1.3 has been found to be adequate for facial detection and works effectively in this case. As indicated next at block 88, for each re-sampled image, a list of candidate regions containing "US DOT" for each re-sampled image can be identified. The regions are examined individually using a classical sliding window search approach, wherein the image in each candidate window is classified by the trained classifier and assigned a probability of containing the text "US DOT". Only regions within the mask identified by the preprocessing operation shown at block 84 are classified. Note that as will be explained in greater detail herein, the confidence of a series of windows with regions of interest of different sizes and aspect rations containing a structure of interest (e.g., USDOT) can be calculated. As will be explained in more detail below, an operation can then be implemented to perform OCR to the region right/below of the highest scoring "US DOT" tags, as shown next at block 90.

A window that perfectly encompasses the text "US DOT" will contain the highest score, but adjacent windows by also score high. Therefore, a non-maximum suppression technique can be applied to adjacent regions that contain high scores to eliminate windows that correspond to the same USDOT tag. Alternatively, the maximum score window can be taken as the location of the USDOT tag before applying non-maximum suppression. The classification models of the previous section can be formulated to assign a probability of a particular area of the image containing the text "US DOT". Typically, most of the image will be classified as not containing "US DOT", but there may be one or more potential candidates. Some of the re-sampled images may contain zero candidates if the font is scaled to a different size from the USDOT dataset.

An example of a candidate area is a situation in which classification scores are indicated by darker or brighter regions. A bright region, for example, can correspond to a high classification score and a dark region can correspond to a low classification score. Note that the classification score here can correspond to the confidence level for the detected tag (i.e., higher the score higher the confidence).

In another embodiment, the trained classifier/model outputs scores for the candidate USDOT locations. Instead of selecting only one location for the USDOT tag, N candidate windows with the highest score can be taken. For each candidate window, OCR can be performed in sequence to the right of the USDOT text and below the USDOT text. The size, location, and aspect ratio of the region can be selected based on the size and aspect ratio of the window that encompasses the USDOT text. If the candidate window does indeed contain USDOT text, then the OCR will return a set of digits with high confidence and that number will be returned as the USDOT tag. If the candidate window does not contain USDOT text, then the OCR will return a set of digits with low confidence or will not return a set of digits. Then, candidate windows are examined in descending sequence of confidence until a USDOT tag is returned with high confidence.

Figure 6:
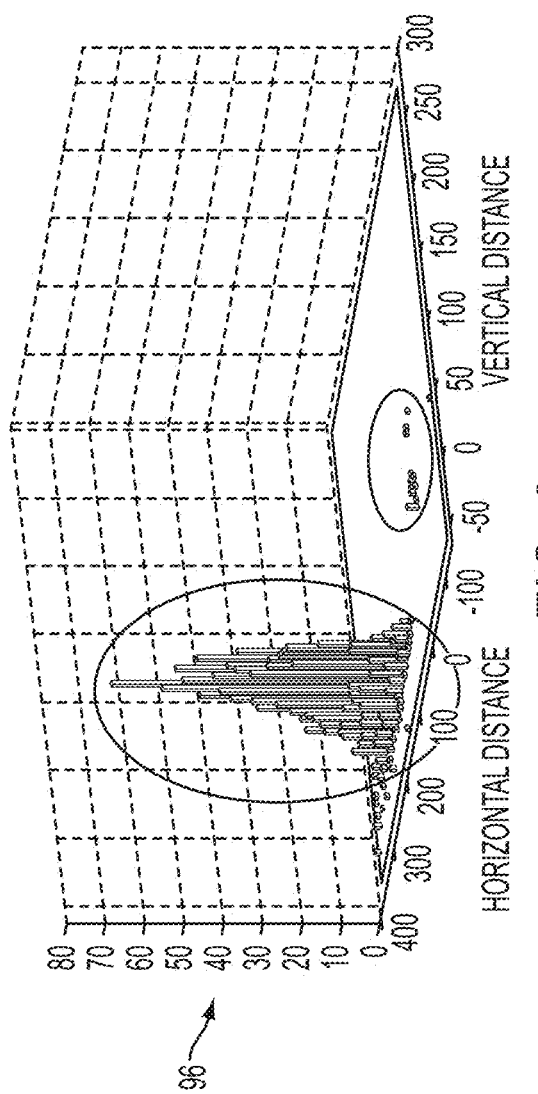
FIG. 6 illustrates a histogram of USDOT number locations with respect to the USDOT text, in accordance with an alternative embodiment.

FIG. 6 illustrates a histogram 96 of USDOT number locations with respect to the USDOT tag locations. The information was taken from the training set. The location (0,0) is the pixel just to the right of the USDOT text. One observes that the majority of the numbers are observed in the horizontal direction between 0 and 200 pixels to the right of the USDOT text. This information can be used to set the window size to examine with OCR. A small minority of cases has the USDOT tag number below the USDOT text between 0 and 50 pixels. If the region to the right of the USDOT text fails to give a USDOT tag number with a high confidence, OCR is performed in the region below the USDOT text.

Figure 7:
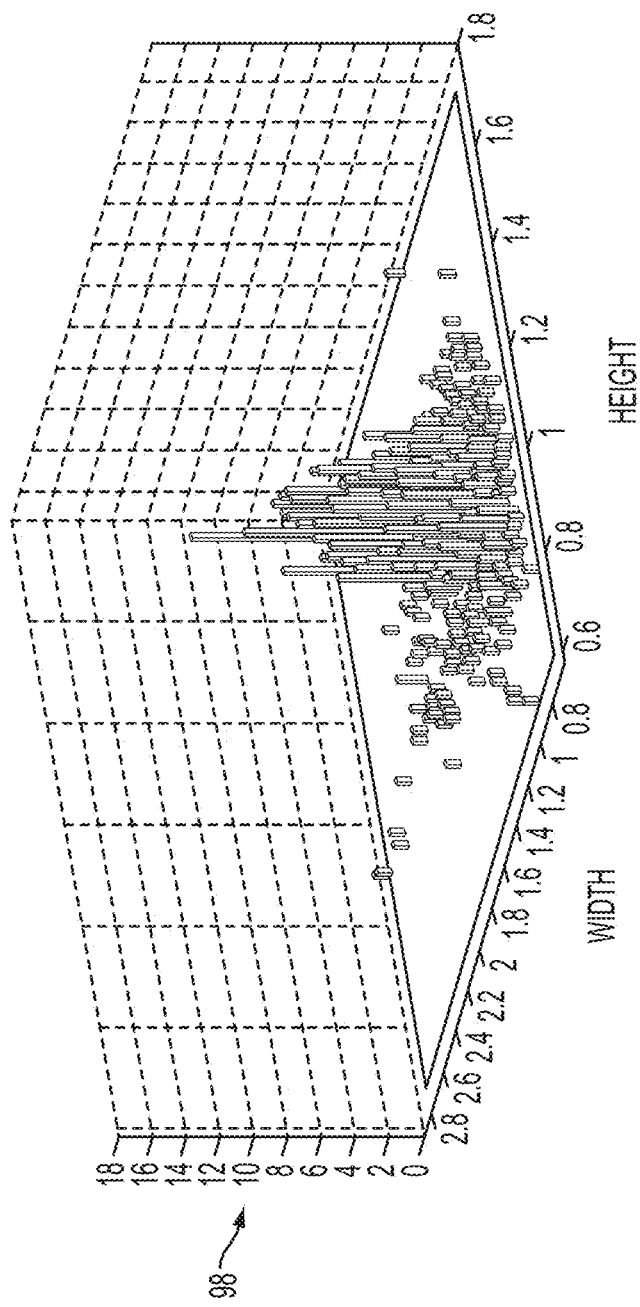
FIG. 7 illustrates a histogram of normalized USDOT number sizes by USDOT text sizes, in accordance with an alternative embodiment.
Figure 8:
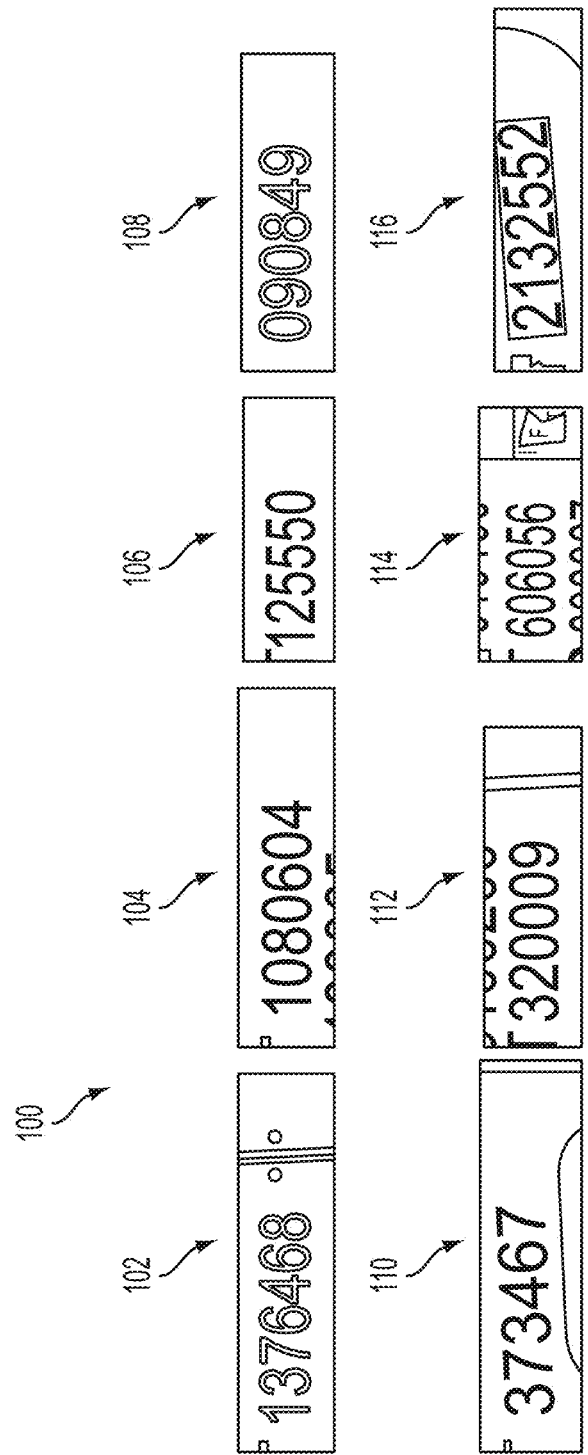
FIG. 8 illustrates a group of images with localized USDOT numbers, in accordance with an alternative embodiment.

FIG. 7 illustrates a histogram 98 of the sizes of the USDOT numbers with respect to the USDOT tag sizes in the same image. The histogram 98 forms an approximate Gaussian distribution with respect to the USDOT tag sizes. The Gaussian distribution is centered at 1, indicating that the size of the digits is equal to the size of the text. Based on the observed histograms, an image patch next to the detected USDOT/DOT tag whose height and width can be determined by the size of the detected tag can be determined as the location of the USDOT number. FIG. 8 illustrates sample image patches automatically cropped from a region next to detected USDOT tags based on observed histograms.

Figure 9:
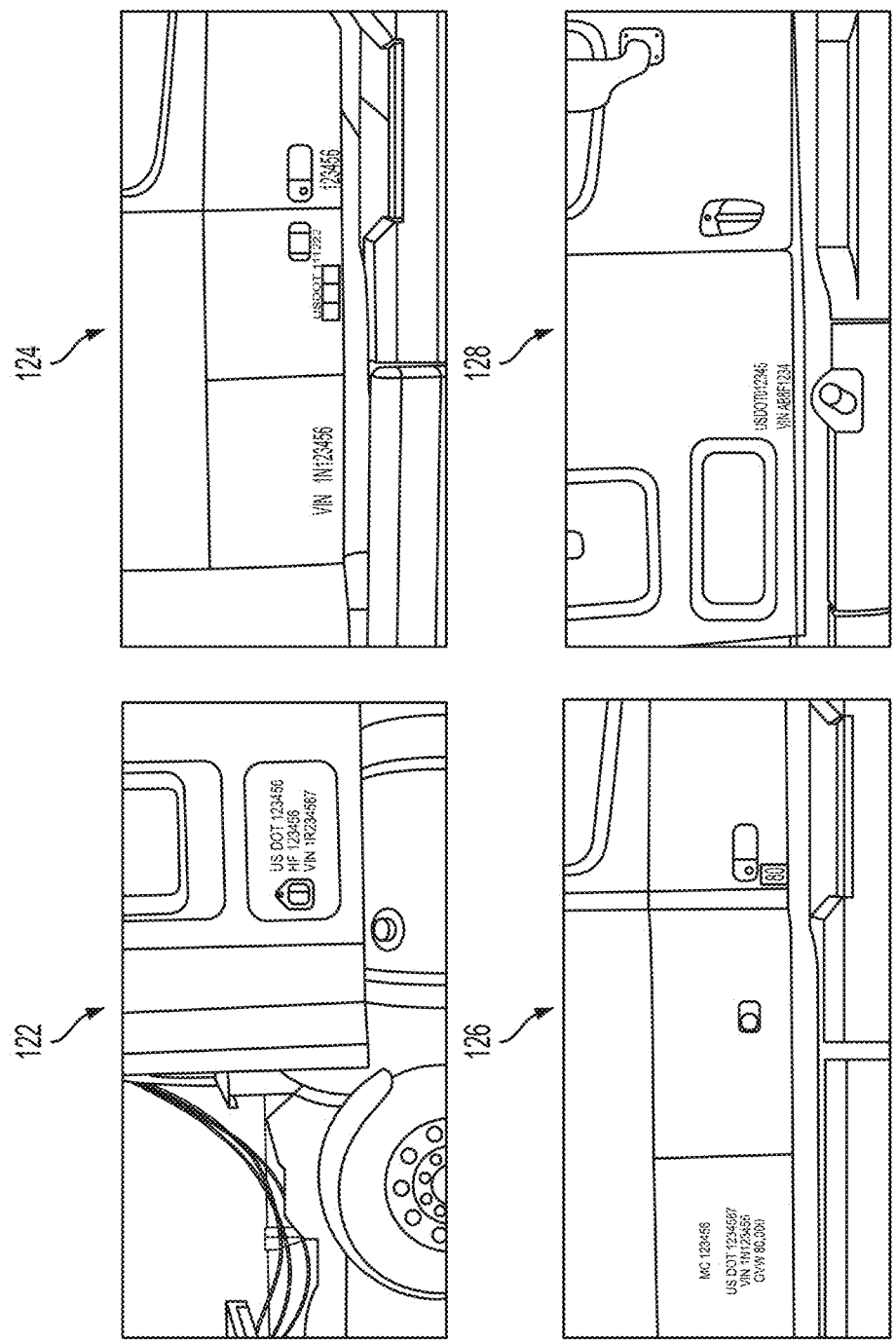
FIG. 9 illustrates USDOT images in a test database, in accordance with an alternative embodiment.

The present inventors have conducted experiments on a database of USDOT images acquired from a real-world application setting. In an experimental set, 2,556 USDOT images were captured during both daytime and nighttime. The resolution of the captured images was 2448×1248 and the size of the height of the USDOT tag was changing between 20 to 100 pixels. FIG. 9 depicts four sample USDOT images 122, 124, 126, and 128 captured during daytime and nighttime, where the size, font, and contrast of the USDOT tags vary.

The present inventors first trained an appearance model for a "DOT" tag using 15 landmarks located around the tag. In this training example, 100 positive and 100 negative samples were employed. For each positive sample, the landmarks were manually located and the model trained using a linear SVM. An example of such a trained model is shown in FIG. 4(*b*). The model was then tested on 2,556 test images and detection scores observed. In 90% of the images, the model correctly located the USDOT tag as the highest score window. In 5% of the images, the disclosed approach identified the USDOT tag as the second highest window and 2% of the cases the USDOT tag was identified as the third highest score window. This data provided significant improvement over existing OCR-based localization approaches.

Figure 10:
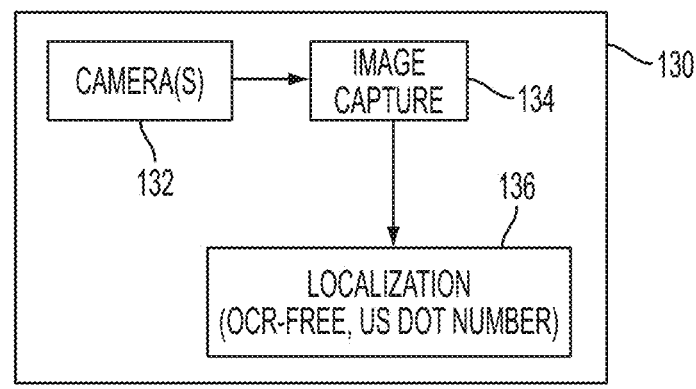
FIG. 10 illustrates block diagram of an example system for implementation of OCR-Free USDOT number localization, in accordance with an alternative embodiment.

FIG. 10 illustrates a block diagram of an example system 130 for implementation of OCR-Free USDOT number localization, in accordance with an alternative embodiment. The system 130 shown in FIG. 10 includes one or more camera(s) 132, which can capture an image of a vehicle as shown at block 134. The image can then be subject to a localization module 136. The localization module 136 performs the OCR-Free USDOT number localization approach disclosed herein.

Figure 11:
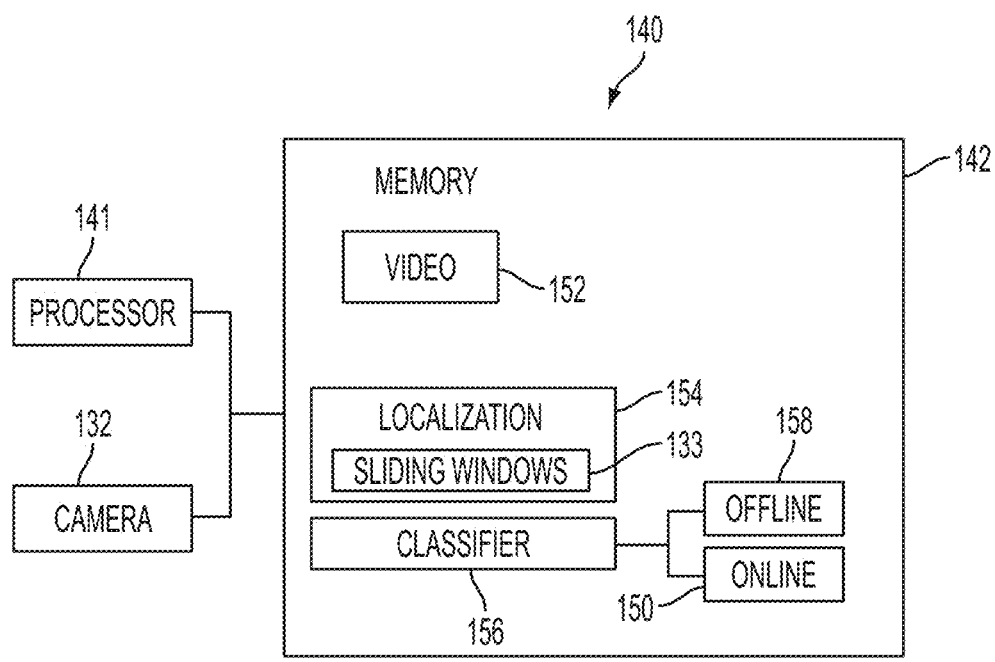
FIG. 11 illustrates a block diagram of an example system for implementation of OCR-Free USDOT number localization including a classifier and sliding windows, in accordance with an alternative embodiment

FIG. 11 illustrates a block diagram of an example system 140 for implementation of OCR-Free USDOT number localization including a classifier and sliding windows, in accordance with an alternative embodiment. Note that in FIGS. 10-11, identical or similar parts or elements are indicated by identical reference numerals. Thus, the camera(s) 132 and the processor 141 can communicate with a computer memory 142, which stores, for example, video data 152 (e.g., video images of a truck captured by camera(s) 132), along with the localization module 154, a classifier module 156, and modules 158 and 150 for respectively performing offline and online training phases, as discussed herein. Sliding windows 133 are associated with the localization module 154. Note that the localization module 154 shown in FIG. 11 is analogous to the localization module 136 depicting in FIG. 10.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 12:
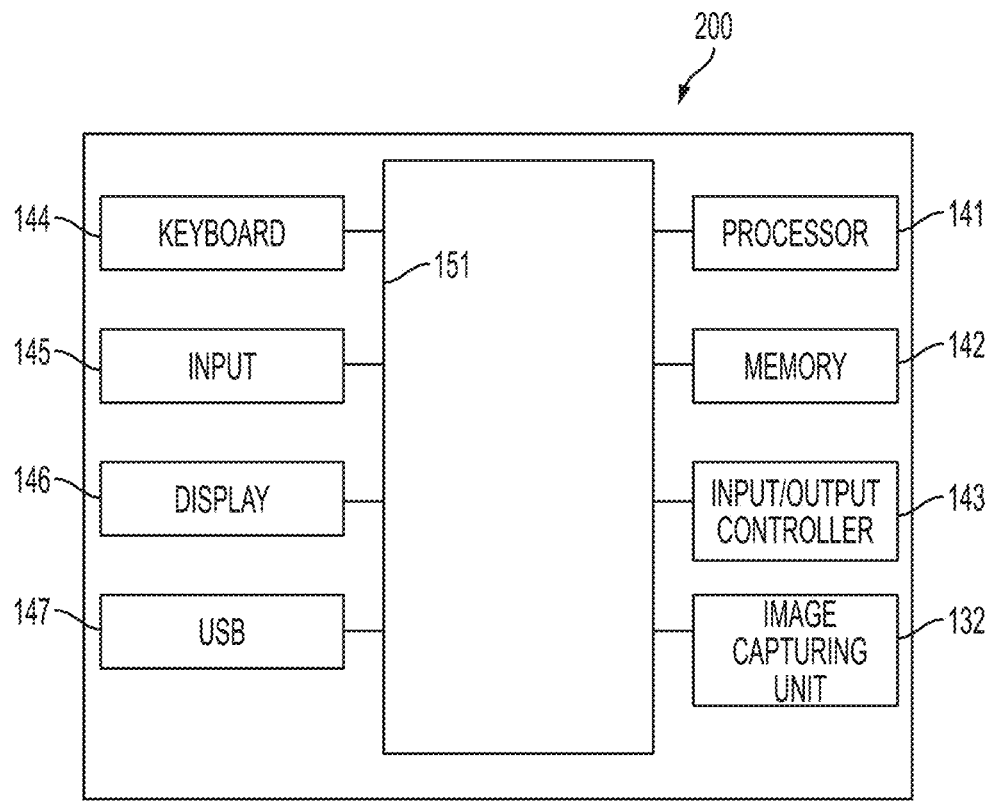
FIG. 12 illustrates a schematic view of a computer system, in accordance with an embodiment.
Figure 13:
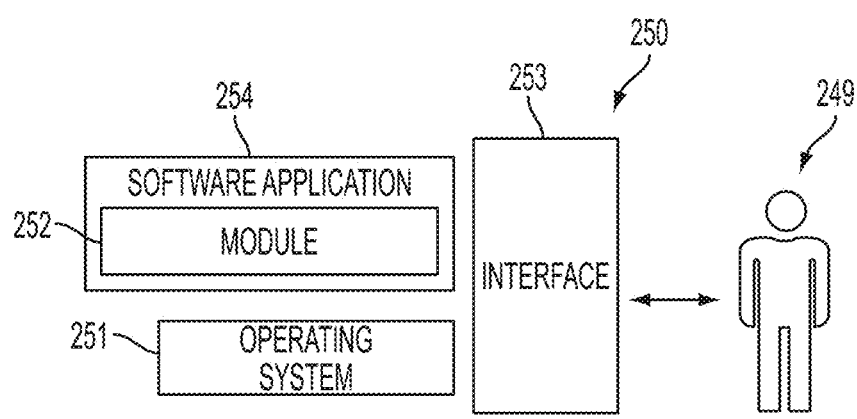
FIG. 13 illustrates a schematic view of a software system including a module, an operating system, and a user interface, in accordance with an embodiment.

FIGS. 12-13 are provided as exemplary diagrams of data-processing environments in which embodiments of the present invention may be implemented. It should be appreciated that FIGS. 12-13 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 12, some embodiments may be implemented in the context of a data-processing system 200 that includes, for example, a processor 141, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc.

FIG. 13 illustrates a computer software system 250 for directing the operation of the data-processing system 200 depicted in FIG. 12. Software application 254, stored for example in memory 142, generally includes a module 252. The computer software system 250 further includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user may supply additional inputs or terminate a session. The software application 254 can include the module 252, which can implement instructions or logical operations such as those shown in, for example, FIGS. 2 and 5 herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Examples of such modules include module 136 shown in FIG. 10 and modules 154, 156, 158, and 160 shown in FIG. 11.

FIGS. 12-13 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein. For example, in one embodiment, a method for localizing numbers and characters in captured images can be implemented. Such a method can include the steps or logical operations of, for example: preprocessing a side image of a vehicle captured by one or more cameras to determine one or more regions of interest (ROI); calculating a confidence of a plurality of windows within regions of interest of different sizes and aspect ratios containing a structure of interest; identifying highest confidence candidate regions with respect to the regions of interest and one or more regions adjacent to the highest confidence candidate regions; performing an optical character recognition in the adjacent region(s); and returning an identifier from the adjacent region(s) in order to localize numbers and characters in the side image of the vehicle.

In some embodiments, the highest confidence candidate regions can be identified with nonmaximal suppression. In other embodiments, a window size of the adjacent region(s) can be determined by a window size of one or more candidate regions among the highest confidence candidate regions. In some embodiments, the confidence (e.g., a confidence value) can be determined with a classifier. In yet other embodiments, the size and aspect ratio of the windows can span an expected size and aspect ratio of the structure of interest.

In another embodiment, the aforementioned identifier can be a tag number. In yet another embodiment, the returned identifier can be calculated using, for example, optical character recognition. In some embodiments, the confidence of the returned identifier may exceed a threshold.

In another embodiment, a system for localizing numbers and characters in captured images can be implemented. Such a system can include, for example, one or more cameras, and a processor that communicates with the camera(s). Such a system can further include a computer-usable medium embodying computer program code, the computer-usable medium capable of communicating with the processor. Such computer program code can include instructions executable by the processor and configured for: preprocessing a side image of a vehicle captured by the camera(s) to determine one or more region of interests; calculating a confidence of a plurality of windows within regions of interest of different sizes and aspect ratios containing a structure of interest; identifying highest confidence candidate regions with respect to the regions of interest and one or more regions adjacent to the highest confidence candidate regions; performing an optical character recognition in the adjacent region(s); and returning an identifier from the adjacent region(s) in order to localize numbers and characters in the side image of the vehicle.

In another embodiment, a processor-readable medium storing code representing instructions to cause a process for localizing numbers and characters in captured images can be implemented. Such code can include code to, for example: preprocess a side image of a vehicle captured by one or more cameras to determine one or more regions of interest; calculate a confidence of a plurality of windows within regions of interest of different sizes and aspect ratios containing a structure of interest; identify highest confidence candidate regions with respect to the regions of interest and one or more regions adjacent to the highest confidence candidate regions; perform an optical character recognition in the adjacent region(s); and return an identifier from the adjacent region(s) in order localize numbers and characters in the side image of the vehicle.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

The invention claimed is:

1. A method for localizing numbers and characters in captured images, said method comprising:
   training a machine learning classifier in an offline training phase;
   automatically preprocessing a side image of a vehicle digitally captured by at least one camera to determine at least one region of interest in said side image, said at least one region of interest among regions of interest, said preprocessing comprising computer vision including median filtering to remove salt and pepper noise from said side image;
   determining by said machine learning classifier a confidence of a series of windows within said regions of interest of said side image, said regions of interest comprising regions of interest of different sizes and aspect ratios, said regions of interest containing a structure of interest in said side image, said confidence comprising a measure of certainty and said structure of interest comprising text including numbers and/or an image of a physical structure of at least one object contained in said side image;
   identifying highest confidence candidate regions among said regions of interest that have said structure of interest and identifying at least one region adjacent to said highest confidence candidate regions;
   performing an optical character recognition in said at least one adjacent region; and
   returning an identifier from said at least one adjacent region in order to localize numbers and characters in said side image of said vehicle.

2. The method of claim 1 wherein said highest confidence candidate regions are identified with nonmaximal suppression.

3. The method of claim 1 wherein a window size of said at least one adjacent region is determined by a window size of at least one candidate region among said highest confidence candidate regions.

4. The method of claim 1 wherein said confidence is automatically determined with said classifier, said classifier comprising a KNN (k-nearest neighbor) classifier, and wherein said classifier is trained in said offline training phase based on extracted features that include a Fisher Vector.

5. The method of claim 4 wherein a size and aspect ratio of said series of windows spans an expected size and aspect ratio of said structure of interest.

6. The method of claim 4 wherein said identifier comprises a tag number.

7. The method of claim 4 wherein said returned identifier is calculated using said optical character recognition.

8. The method of claim 7 wherein a confidence of said returned identifier exceeds a threshold.

9. A system for localizing numbers and characters in captured images, said system comprising:
   at least one camera;
   a processor that communicates with said at least one camera; and
   a non-transitory computer-usable medium embodying computer program code, wherein said computer-usable medium communicates with the processor, said computer program code comprising instructions executable by said processor and configured for:
   training a machine learning classifier in an offline training phase;
   automatically preprocessing a side image of a vehicle digitally captured by said at least one camera to determine at least one region of interest in said side image, said at least one region of interest among regions of interest, said preprocessing comprising computer vision including median filtering to remove salt and pepper noise from said side image;
   determining by said machine learning classifier a confidence of a series of windows within said regions of interest of said side image, said regions of interest comprising regions of interest of different sizes and aspect ratios, said regions of interest containing a structure of interest in said side image, said confidence comprising a measure of certainty and said structure of interest comprising text including numbers and/or an image of a physical structure of at least one object contained in said side image;
   identifying highest confidence candidate regions among said regions of interest that have said structure of interest and identifying at least one region adjacent to said highest confidence candidate regions;
   performing an optical character recognition in said at least one adjacent region; and
   returning an identifier from said at least one adjacent region so as to localize numbers and characters in said side image of said vehicle.

10. The system of claim 9 wherein said highest confidence candidate regions are identified with nonmaximal suppression.

11. The system of claim 9 wherein a window size of said at least one adjacent region is determined by a window size of at least one candidate region among said highest confidence candidate regions.

12. The system of claim 9 wherein said confidence is automatically determined with said machine learning classifier, said machine learning classifier comprising a KNN (k-nearest neighbor) classifier and wherein said classifier is trained in said offline training phase based on extracted features that include a Fisher Vector.

13. The system of claim 12 wherein a size and aspect ratio of said series of windows spans an expected size and aspect ratio of said structure of interest.

14. The system of claim 12 wherein said identifier comprises a tag number.

15. The system of claim 12 wherein said returned identifier is calculated using said optical character recognition.

16. The system of claim 15 wherein a confidence of said returned identifier exceeds a threshold.

17. A non-transitory processor-readable medium storing code representing instructions to cause a computer executable process for localizing numbers and characters in captured images to:
   train a machine learning classifier in an offline training phase;
   automatically preprocess a side image of a vehicle digitally captured by at least one camera to determine at least one region of interest in said side image, said at least one region of interest among regions of interest, said preprocessing comprising computer vision including median filtering to remove salt and pepper noise from said side image;
   determine by said machine learning classifier a confidence of a series of windows within said regions of interest of said side image, said regions of interest comprising regions of interest of different sizes and aspect ratios, said regions of interest containing a structure of interest in said side image, said confidence comprising a measure of certainty and said structure of interest comprising text including numbers and/or an image of a physical structure of at least one object contained in said side image;
   identify highest confidence candidate regions among said regions of interest that have said structure of interest and identifying at least one region adjacent to said highest confidence candidate regions;
   perform an optical character recognition in said at least one adjacent region; and
   return an identifier from said at least one adjacent region in order to localize numbers and characters in said side image of said vehicle.

18. The processor-readable medium of claim 17 wherein said highest confidence candidate regions are identified with nonmaximal suppression and wherein a window size of said at least one adjacent region is determined by a window size of at least one candidate region among said highest confidence candidate regions.

19. The processor-readable medium of claim 17 wherein said confidence is automatically determined with said machine learning classifier, said machine learning classifier comprising a KNN (k-nearest neighbor) classifier and wherein said classifier is trained in said offline training phase based on extracted features that include a Fisher Vector.

20. The processor-readable medium of claim 19 wherein a size and aspect ratio of said series of windows spans an expected size and aspect ratio of said structure of interest and wherein said identifier comprises a tag number.

* * * * *